July 22, 1969 E. PETER 3,456,973

CORNER JOINT ASSEMBLY WITH CONNECTING MEANS

Filed Aug. 2, 1967

INVENTOR:
Erwin Peter

BY Karl F. Ross

United States Patent Office 3,456,973

Patented July 22, 1969

1

3,456,973

CORNER JOINT ASSEMBLY WITH CONNECTING MEANS

Erwin Peter, Altheim, Austria, assignor to Vereinigte Metallwerke Ranshofen-Berndorf, Vienna, Austria, a corporation of Austria Filed Aug. 2, 1967, Ser. No. 657,882
Claims priority, application Austria, Aug. 3, 1966, A 7,422/66
Int. Cl. F16b 12/46, 9/00
U.S. Cl. 287—189.36 5 Claims

ABSTRACT OF THE DISCLOSURE

Connecting assembly for hollow profiles at the corners of frames and the like wherein the hollow profile has at least three angles adjoining sides in cross-section at the junction and the assembly includes a pair of angular inserts loosely fitting between two of the sides but conforming substantially to the section of the frame with juxtaposed faces lying transversely to the other wall. The inserts are clamped at their ends between a pair of clamping bodies with respect to the frame while studs are driven through the third wall between the juxtaposed faces to wedge the inserts outwardly against the first-mentioned walls and in part compress the inserts, thereby locking the corner. The studs pass through the third wall without predrilling thereof and lie flush with the wall surface.

The invention refers to a method of connecting hollow sections (e.g. tubular profiled structural members), involving the use of insert interconnecting the profiles. It has been well known to use angle inserts, attached to the frame sections by adhesives or screws, in order to avoid expensive and time-consuming welding of frame corners. This, however, involves the drawback that inadequate fitting of respective parts may cause rattling or insufficient stiffness (rigidity), so that attempts have been made to find ways for achieving adequate clamping. This can either be achieved by slotting the inserts and expanding their hollow sections by means of screws or by moving wedge-shaped surfaces towards each other by means or screws and thus forcing the slotted portions of the inserts apart.

However, these methods have the disadvantage that the screws or wedges inside the hollow section are of limited accessibility and only provide limited assurance against loosening of the frame.

This invention avoids these drawbacks by inserting two insert or filler bodies into the hollow profile at each junction, and by expanding the filler assembly by small struts, especially bolts or studs in a way such that the sections are connected tensionally and frictionlessly.

These bolts are inserted from the exterior and specially provided fitting bores are not necessary. Plastic deformation of the inserts also insures permanent fit.

The attached drawing illustrates a practical example of the invention.

Figure 1:
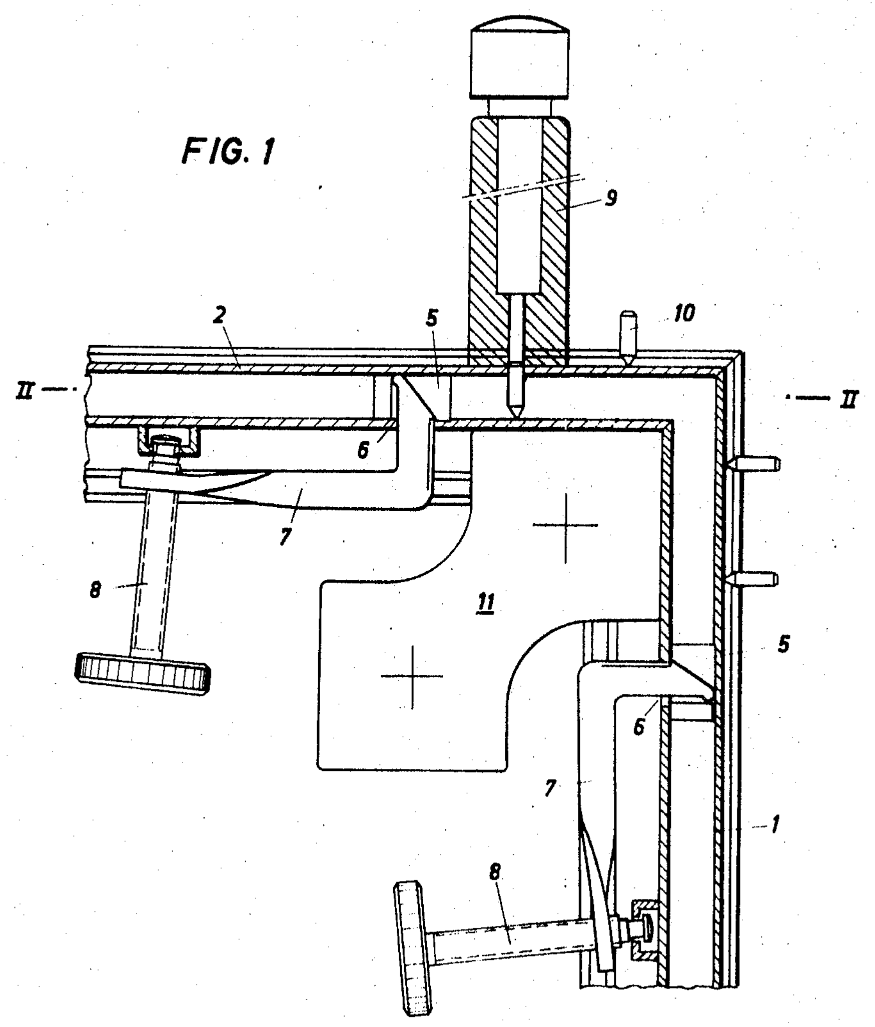
Figure 2:
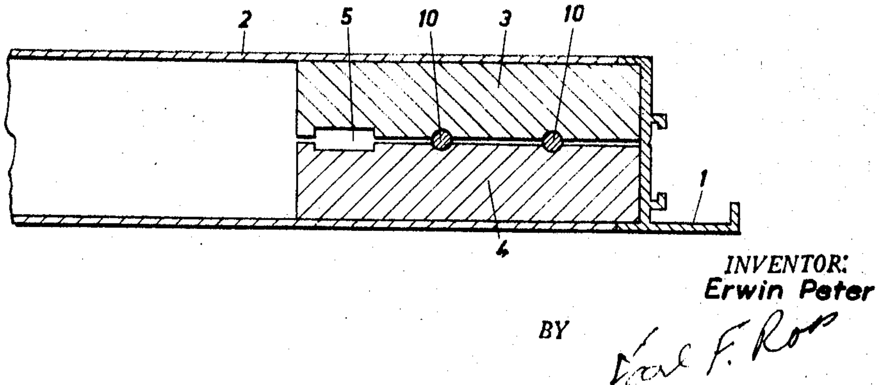

FIG. 1 shows a corner connection, during installation according to the invention; and FIG. 2 shows a sectional view of filler members received in corners of the section in the finished state.

From the drawing it can be seen that a corner connection in a window frame can be formed from the miter-cut hollow sections 1 and 2 by inserting two geometrically similar right-angle filler insert bodies 3 and 4 into the hollow sections 1, 2. The angle members 3 and 4 are furnished with registering recesses 5, engaged by bolt levers 7, extending through openings 6 provided in the inner surfaces of profile sections 1 and 2. These bolt levers 7 are braced by screws 8, disposed opposite the

2 hollow sections 1 and 2 and this way cause contraction of the hollow sections 1 and 2 by means of the inserts 3 and 4, so that they are urged together and clamped at their bevelled surfaces. Then pointed cylindrical bolts or studs 10, made of a hard material, such as steel or high-strength aluminum alloy are driven through the outer wall of the hollow sections 1 and 2 between the two angle inserts 3 and 4 by means of a driving (stud-setting) device 9. Stop 11 serves for counterholding. The angle inserts 3 and 4 are deformed by the cylindrical bolts 10 along their facing surfaces and are simultaneously pressed outside towards the walls of the hollow profiles 1 and 2, so that a good fit is insured. Plastic deformability of the inserts 3 and 4 also guarantees good fitting of bolts 10, so that they become secure as far as lateral displacement, gliding out or loosening are concerned. As the bolts 10 can be driven into the puttying groove, they will not be visible from outside as soon as the windows are furnished with glass.

The invention not only is restricted to the practical example represented by the attached drawing, but also can be applied for straight connections. The bolts also can be driven on by means of a cartridge-operated stud-setting device and the bolts also can have various shapes. The bolts can be driven in, both from inside and from outside.

Hollow sections formed from one single piece also can be replaced by sections consisting of several parts.

I claim:

1. A corner-junction assembly, comprising a pair of angularly adjoining miter-cut hollow-profile frame members each having a pair of mutually parallel lateral walls and at least one peripheral wall extending perpendicularly to said lateral walls; a pair of geometrically similar angular insert bodies having legs adjoining at the angle of the junction of said members and received within the interiors thereof with a collective width between said lateral walls less than the internal distance between said walls, said insert bodies having juxtaposed surfaces running parallel to said lateral walls and perpendicularly to said peripheral walls of said members; and a plurality of studs driven through the peripheral walls of each of said members and between said juxtaposed surfaces of said insert bodies to urge said insert bodies under compression against said lateral walls, said studs transfixing said peripheral walls.

2. The assembly defined in claim 1, further comprising means of said members and said insert bodies enabling clamping of said members at said junction relatively to said bodies prior to the setting of said studs therein.

3. The assembly defined in claim 1 wherein said studs are flush with the external surface of each of said peripheral walls.

4. The assembly defined in claim 1 wherein said studs lie in a common plane parallel to said lateral walls, said members being formed along said peripheral wall with a putting groove, said studs being seated at the base of said groove.

5. A method of connecting a pair of miter-cut frame members at an angular junction, said frame members having hollow-profile sections with a pair of opposite lateral walls and a peripheral wall interconnecting said lateral walls, said method comprising the steps of inserting in the hollow-profile sections of the frame members a pair of geometrically similar angular inserts received with play between the lateral walls of both members and having juxtaposed surfaces extending transversely to said peripheral wall; clamping said members together at the angular junction therebetween by shifting each of said members relative to said insert toward said junction, thereby clamping said inserts relative to said members; and driving through each of said peripheral walls of said members a plurality of studs between said surfaces of said inserts, thereby spreading said inserts against said lateral walls of said members under compression.

References Cited

UNITED STATES PATENTS

| | | | |
|---|---|---|---|
| 2,126,161 | 8/1938 | Woodward | 29—432.2 |
| 2,848,289 | 8/1958 | Page | 287—189.36 |

FOREIGN PATENTS

| | | |
|---|---|---|
| 579,731 | 7/1958 | Italy. |

MARION PARSONS, Jr., Primary Examiner

U.S. Cl. X.R.

29—432, 446, 525, 526